United States Patent
Kirsch et al.

(10) Patent No.: US 9,516,024 B2
(45) Date of Patent: Dec. 6, 2016

(54) CONNECTION AUTHENTICATION

(71) Applicant: Honda Motor Co., Ltd., Tokyo (JP)

(72) Inventors: David M. Kirsch, Torrance, CA (US); Justin Sinaguinan, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 14/255,340

(22) Filed: Apr. 17, 2014

(65) Prior Publication Data
US 2015/0304324 A1   Oct. 22, 2015

(51) Int. Cl.
G06F 7/04 (2006.01)
H04L 29/06 (2006.01)
H04W 12/06 (2009.01)
H04W 84/18 (2009.01)

(52) U.S. Cl.
CPC .......... H04L 63/0876 (2013.01); H04W 12/06 (2013.01); H04W 84/18 (2013.01)

(58) Field of Classification Search
CPC .. H04W 40/246; H04W 76/025; G06F 21/44
USPC ............................................................ 726/5
See application file for complete search history.

(56) References Cited

U.S. PATENT DOCUMENTS

| | | | |
|---|---|---|---|
| 7,953,400 B2 | 5/2011 | Lee et al. | |
| 8,204,649 B2 | 6/2012 | Zhou et al. | |
| 8,295,766 B2 | 10/2012 | Zimbric et al. | |
| 8,432,260 B2 | 4/2013 | Talty et al. | |
| 8,432,261 B2 | 4/2013 | Talty et al. | |
| 8,432,262 B2 | 4/2013 | Talty et al. | |
| 8,527,013 B2 | 9/2013 | Guba et al. | |
| 8,626,144 B2 * | 1/2014 | Talty et al. .................... | 455/418 |
| 2007/0100507 A1 * | 5/2007 | Simon .............................. | 701/1 |
| 2008/0102854 A1 | 5/2008 | Yi et al. | |
| 2008/0227434 A1 * | 9/2008 | Nitta .................. | H04B 7/18506 455/414.1 |
| 2008/0312788 A1 * | 12/2008 | Aulakh et al. .................. | 701/36 |
| 2009/0061769 A1 | 3/2009 | Zimbric et al. | |
| 2010/0216400 A1 * | 8/2010 | Ushijima ............ | H04M 1/6091 455/41.2 |
| 2011/0117845 A1 | 5/2011 | Kirsch et al. | |
| 2011/0156924 A1 * | 6/2011 | Nadeem et al. .............. | 340/905 |
| 2011/0281519 A1 | 11/2011 | Reuss et al. | |

(Continued)

OTHER PUBLICATIONS

Riener et al, Driver-Vehicle Confluence or How to Control your Car in Future?, Oct. 19, 2012, pp. 217-224.*

(Continued)

*Primary Examiner* — Luu Pham
*Assistant Examiner* — Jenise Jackson
(74) *Attorney, Agent, or Firm* — Rankin, Hill & Clark LLP

(57) ABSTRACT

One or more embodiments of techniques or systems for connection authentication are provided herein. A mobile device or device may act as an initiator of a connection with a vehicle, which acts as a target. A user utilizing the device may initiate a connection request by launching an application or browser on the device. The device transmits the connection request to the vehicle. The vehicle may receive the connection request and respond with a device identifier (ID) request. A user of the device may select whether or not to continue. If the user continues, the device transmits a device ID of the device to the vehicle. An interface component may render the connection request for an occupant of the vehicle, such as the driver, and await a response. In this way, a driver of a vehicle may act as a gatekeeper for connections.

13 Claims, 6 Drawing Sheets

(56) References Cited

U.S. PATENT DOCUMENTS

| | | | |
|---|---|---|---|
| 2012/0095642 A1* | 4/2012 | Nishida | 701/31.4 |
| 2012/0122525 A1 | 5/2012 | Miller et al. | |
| 2012/0142367 A1 | 6/2012 | Przybylski | |
| 2012/0197484 A1* | 8/2012 | Nath et al. | 701/32.4 |
| 2012/0322376 A1 | 12/2012 | Couse | |
| 2013/0271275 A1* | 10/2013 | Schalk | 340/438 |
| 2013/0281017 A1 | 10/2013 | Bondesen et al. | |
| 2013/0316737 A1 | 11/2013 | Guba et al. | |
| 2014/0031010 A1* | 1/2014 | Wuergler et al. | 455/411 |
| 2014/0057563 A1 | 2/2014 | Salahshoor | |
| 2014/0096217 A1* | 4/2014 | Lehmann | H04L 63/08 726/7 |
| 2014/0120892 A1* | 5/2014 | Martin | G10L 15/22 455/418 |
| 2014/0179276 A1* | 6/2014 | Kang | H04W 4/008 455/411 |
| 2014/0229035 A1* | 8/2014 | Rector | H04M 1/72577 701/2 |
| 2014/0280580 A1* | 9/2014 | Langlois et al. | 709/204 |
| 2014/0328248 A1* | 11/2014 | Greubel | 370/328 |
| 2015/0024686 A1* | 1/2015 | Hrabak | 455/41.2 |
| 2015/0024688 A1* | 1/2015 | Hrabak | H04W 4/008 455/41.2 |
| 2015/0094929 A1* | 4/2015 | Bell | G07C 5/0808 701/99 |
| 2015/0147974 A1* | 5/2015 | Tucker | G07C 9/00309 455/41.2 |
| 2015/0206526 A1* | 7/2015 | Schild | G01C 21/3629 704/258 |
| 2015/0210287 A1* | 7/2015 | Penilla | B60W 40/08 701/49 |
| 2015/0223273 A1* | 8/2015 | Macdonald | G08C 17/02 370/252 |

OTHER PUBLICATIONS

Koukoumidis et al, Demo: Signal Guru: Leveraging Mobile Phones for Collaborative Traffic Signal Schedule Advisiory, Jul. 1, 2011, p. 353.*

International Searching Authority, International Search Report and Written Opinion, Mailed Jun. 18, 2015, 3 Pages.

* cited by examiner

CONNECTION AUTHENTICATION

BACKGROUND

Generally, a device may connect with another device or a system in a secure manner by establishing a secure connection between the device and the system. For example, a Bluetooth® device may connect with a system of a vehicle or a vehicle via a Bluetooth® connection, a wireless connection, etc. Typically, when an occupant of a vehicle, such as a driver of the vehicle, desires to connect a device with a system of the vehicle or the vehicle, the system of the vehicle may provide the driver or occupant with a personal identification number (PIN) to enter on his or her device. A driver may be prompted to enter this PIN into a device to connect the device with the vehicle or to initiate a pairing between the vehicle or automobile and the device. Once the PIN is manually entered on a device, the device may be placed in a discovery mode, and a connection may be established or created between the device and the vehicle or a system of the vehicle. In this way, the vehicle may recognize when a correct PIN has been entered on the device, and create, authenticate, or establish a connection, secure connection, Bluetooth® connection, wireless connection, communication channel, etc. as a result or in response to entry of the PIN on the device.

However, because manual entry of a PIN is often required, such connections are generally established in scenarios where a vehicle is stationary, not in motion or operation, in park, etc. to mitigate distractions for a driver while operating a vehicle. In some vehicles, it may be impossible to connect devices to the vehicle or a system of the vehicle during operation due to features which disable such interactions or setup of a connection while the vehicle is in motion, for example. A vehicle may require a user, occupant, or driver to place the vehicle in park in order for one or more connections (e.g., Bluetooth®, wireless, Wi-Fi, etc.) between a device and the vehicle to be created or established.

Even when features do not outright stop or prevent an individual, user, occupant, or driver from setting up a connection (e.g., while a vehicle is in motion), a great deal of effort may be required to establish or create such connections because entry of a PIN or interaction with an interface of the vehicle may be necessary. Often, a driver is in close proximity with such an interface for initiating a connection between a device and a vehicle and the onus is on the driver to facilitate navigation of menus or other setup associated with a connection. To this end, it may be tedious for a driver or occupant of a vehicle to connect a device with the vehicle in some scenarios, such as when the vehicle is in motion, for example.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

Generally, a system of a vehicle may facilitate authentication of a connection, such as a Bluetooth® connection, between a device and the vehicle, by providing a personal identification number (PIN) and having a user (e.g., driver or other occupant) type the PIN into a device during authentication. Additionally, some systems or vehicle may require that the vehicle be placed in a mode, such as park, while entering the PIN into the device. In one or more embodiments, an occupant of a vehicle, such as a driver, is provided with a way to authenticate, establish, or create one or more connections for one or more devices or mobile devices. Because it is generally desirable for a driver to keep his or her eyes on the road, an interface may be provided for the driver which enables the driver to quickly respond to authentication requests from one or more devices or mobile devices, such as mobile devices of passengers of the vehicle.

As an example, an occupant of the vehicle, such as a passenger, may utilize an application on his or her mobile device to initiate a request for a connection (e.g. connection request) with the vehicle or a system of the vehicle, thereby making the mobile device an initiator of a connection and the vehicle a target or a beacon. The vehicle may receive the request for the connection or connection request and respond with a request for a device identifier from the mobile device. For example, the mobile device may respond to the request for the device identifier with a device identifier associated with the mobile device (e.g., a media access control (MAC) address, "Bob's Phone"). This device identifier may be presented to the driver of the vehicle. Thereafter, the driver may respond to the connection request from the mobile device by accepting or denying the connection request. When the driver accepts the connection request, a connection may be established between the mobile device associated with the device identifier and the vehicle or a system of the vehicle. In other words, one or more devices may be connected with one or more other devices, systems of the vehicle, or the vehicle based on approval of an occupant of the vehicle.

Accordingly, an occupant of the vehicle, such as the driver, may effectively become a gatekeeper for authenticating, establishing, or creating connections (e.g., Bluetooth® connections, wireless connections, short range communications, etc.) between one or more devices or mobile devices and a vehicle or system of a vehicle. Further, an interface component or an audio component may render connection requests and corresponding device identifiers for a driver in a manner which requires less hassle or driver interaction to respond to than typical pairing procedures, such as by not utilizing a PIN for authentication, for example. Other aspects enable an occupant, such as a driver, to provide, create, establish, authenticate, etc. a connection with a device without requiring navigation or setup, such as manually navigating through a connection menu. When a connection request is received, the driver may be presented with an accept option and a deny option on an interface, thereby enabling the driver to enable or disable incoming connection requests from one or more devices (e.g., associated with passengers of a vehicle). The driver may thus point, click, touch, actuate, or speak a response to facilitate forming (or denying) the connection.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
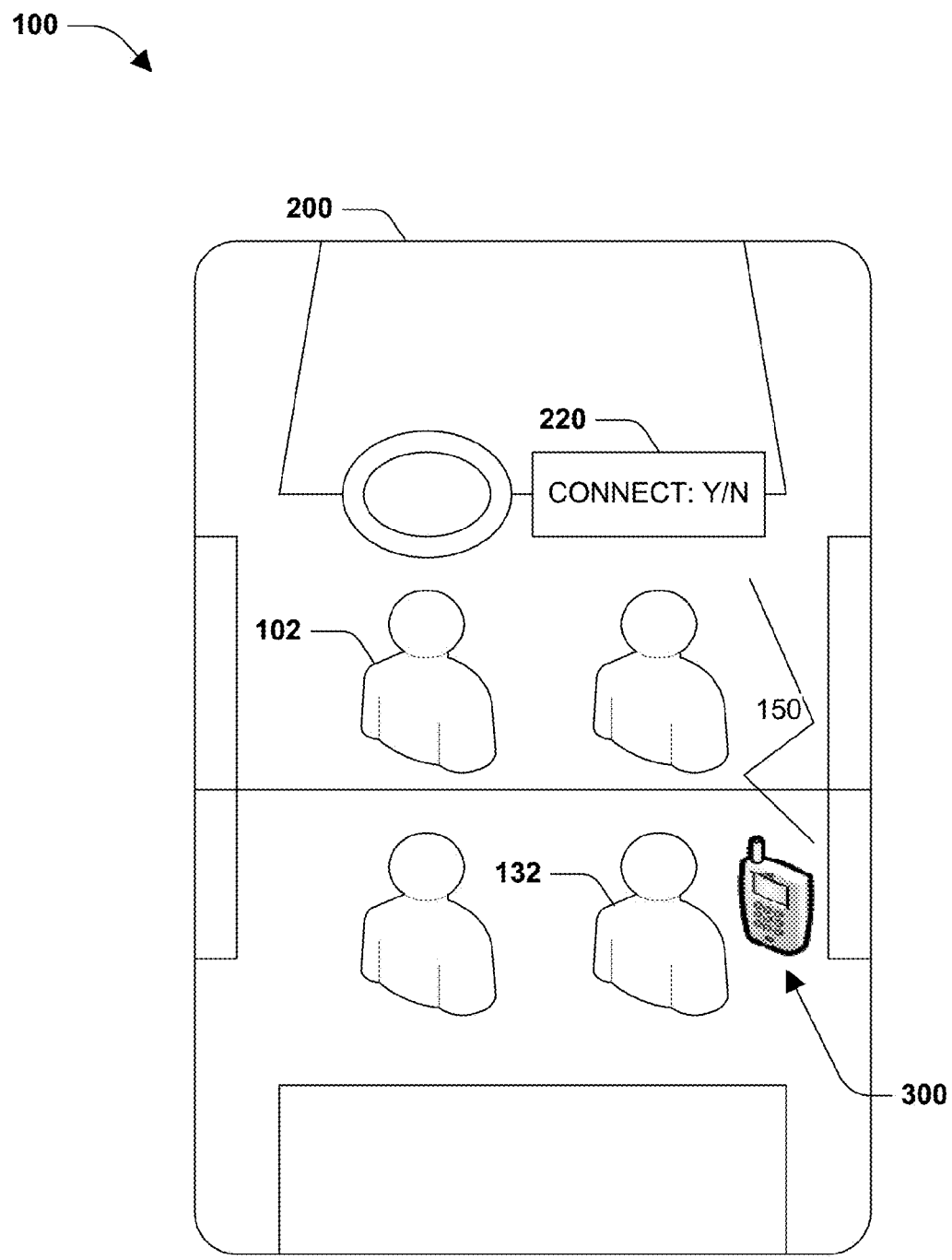
FIG. 1 is an illustration of an example scenario where a device may connect with a vehicle using connection authentication, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 6:
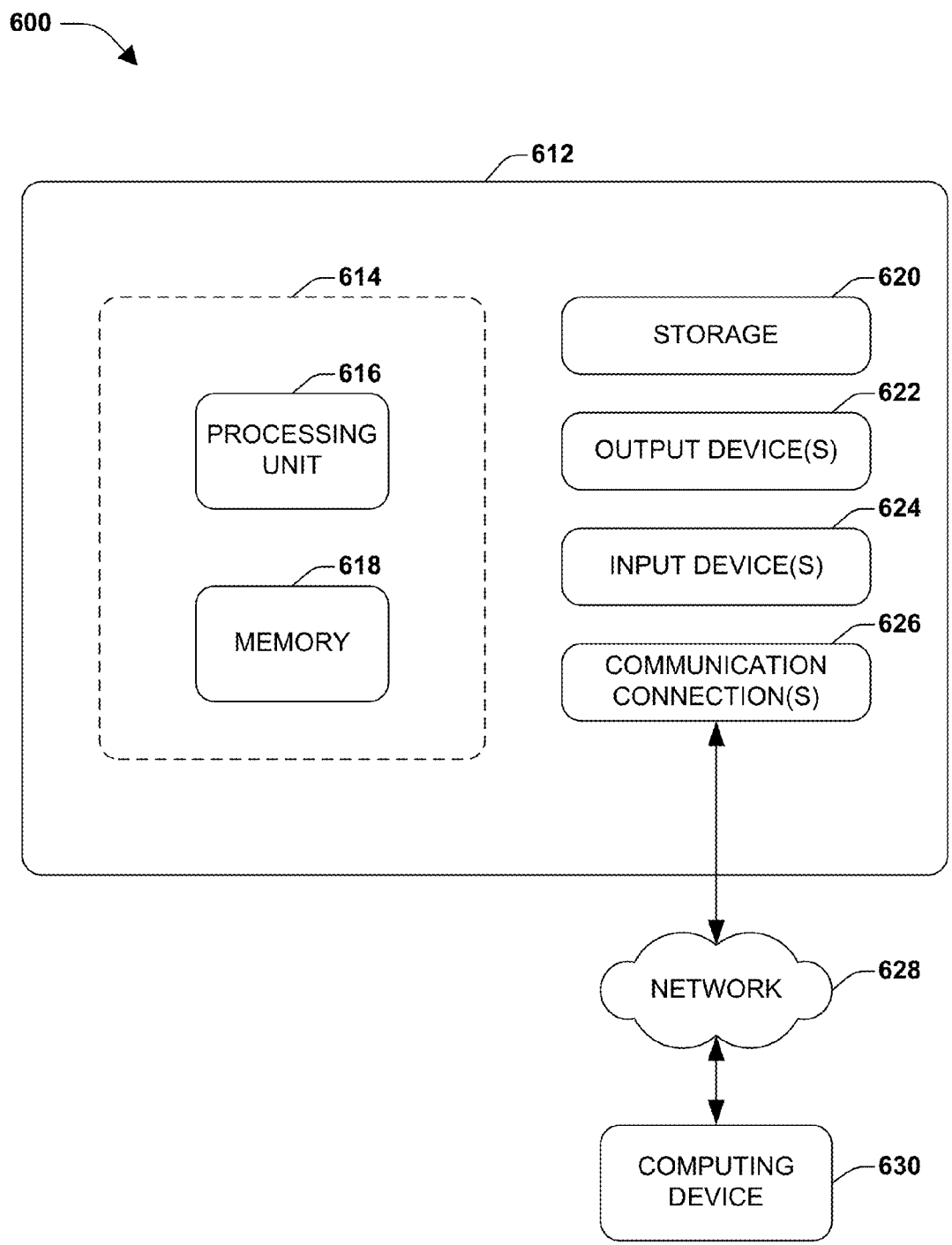
FIG. 6 is an illustration of an example computing environment where one or more of the provisions set forth herein are implemented, according to one or more embodiments.

For one or more of the figures herein, one or more boundaries, such as boundary 614 of FIG. 6, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, a connection may include or be based on short range communication, near field communication (NFC), Wi-Fi technologies, wireless technologies, telematics, telecommunications, Bluetooth®, or other communication channels, such as universal serial bus (USB), etc. Additionally, a connection may be established utilizing multiple technologies. For example, NFC may be utilized to prepare a device to initiate a connection with a vehicle, while the connection itself may be implemented utilizing Wi-Fi, wireless technologies, telematics, etc.

A device may be or include a mobile device, a cellular phone, a personal device assistant (PDA), smart phone, pocket personal computer (PC), laptop computer, desktop computer, smart watch, or other devices having a processor, processing unit, or memory. A device may run one or more applications, programs, or 'apps'. An application may be part of a larger suit of features or interactions. Examples of applications include applications available for the iPhone™, applications for devices running the Android™ operating system, applications for BlackBerry devices, tablets, or most any other device, etc.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example scenario 100 where a device may connect with a vehicle using connection authentication, according to one or more embodiments. In the scenario 100 of FIG. 1, an occupant of a vehicle 200, such as a driver 102 of the vehicle, may be provided with a way to authenticate, establish, or create one or more connections 150 between one or more devices 300 and the vehicle 200. Because it is generally desirable for a driver 102 to keep his or her eyes on the road, an interface 220 may be provided with which one or more occupants of the vehicle may interact. The interface 220 may enable the driver to quickly respond to authentication requests or connection requests from one or more devices 300 of one or more passengers, other occupants, or users 132 of the vehicle 200.

In the scenario 100 of FIG. 1, occupant or user 132 may wish to connect his or her device 300 (e.g., mobile device, smart phone, cellular phone, etc.) to the vehicle 200 such that the device 300 is communicatively coupled with the vehicle 200. As a brief overview of an example embodiment, the user 132 may launch an application on his or her mobile device 300, allowing the mobile device to poll or search for one or more target systems. In this example, the mobile device 300 may find the vehicle 200. The mobile device 300 may then send the vehicle 200 a connection request. In response, the vehicle 200 may request a device identifier from the mobile device 300. The mobile device 300 may prompt the user for permission or confirmation prior to transmitting the device identifier of the mobile device 300 to the vehicle 200. The vehicle 200 may render a notification to an occupant, such as the driver 102, via an interface component 220. The interface component 220 may present a message to the driver 102, prompting the driver 102 to accept or deny a connection 150 with the device 300. If the driver 102 accepts the prompt or connection request, connection 150 is created or established.

Figure 2:
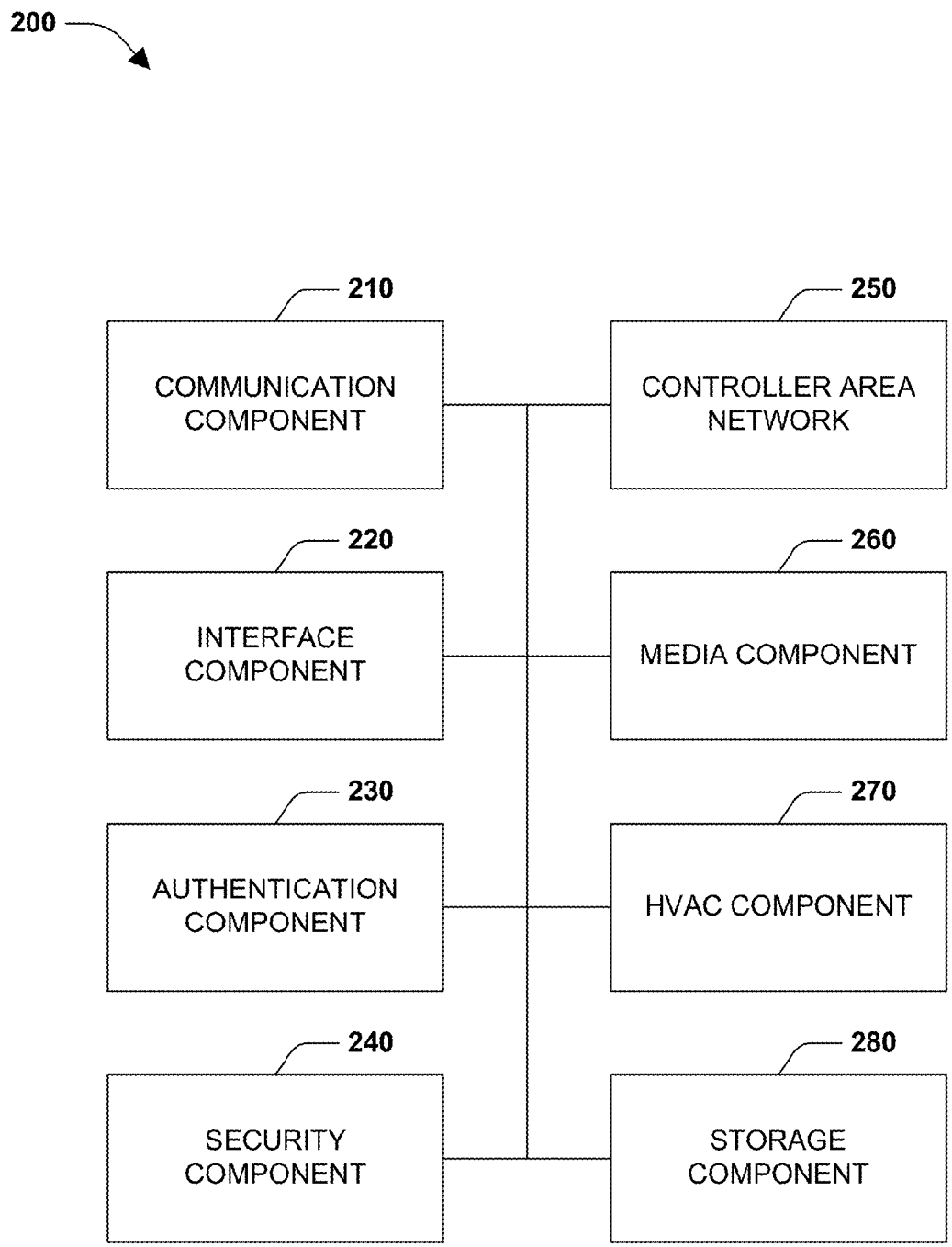
FIG. 2 is an illustration of an example component diagram of a system for connection authentication, according to one or more embodiments.

FIG. 2 is an illustration of an example component diagram of a system 200 for connection authentication, according to one or more embodiments. The system 200 may include a communication component 210, an interface component 220, an authentication component 230, a security component 240, a controller area network (CAN) 250, a media component 260, a heating, ventilation, and air conditioning (HVAC) component 270, and a storage component 280. In one or more embodiments, the media component 260 may include an audio component, a navigation component, a display component, a text to speech (TTS) component, etc. Additionally, the system 200 may include a memory, a processor, a processing unit, etc., as will be discussed herein.

The communication component 210 of the system 200 for connection authentication may receive a request for a connection (e.g., a connection request). For example, the communication component 210 may receive a connection request from a device which may be acting as an initiator for a connection. A connection request may be a request from a device (e.g., mobile device or other device) to form, establish, authenticate, or create a connection or a secure connection between the device and a respective system (e.g., system 200 of a system of a vehicle). In this way, the communication component 210 may facilitate pairing or connection of two or more devices or systems where the device acts as the initiator, and the vehicle or a system of the vehicle acts as a target for the device initiating the connection between the two.

In response to the connection request from the device, the communication component 210 may respond with a request for a device identifier (e.g., device identifier request) for the device. The communication component 210 may transmit a device identifier request in response to the connection request. A device identifier may be unique to a device and utilized to identify a corresponding device. In one or more embodiments, the device identifier may include a media access control (MAC) address of a device, a nickname associated with the device, a serial number, etc. In other words, the device may respond to the request for the device identifier or device identifier request with a device identifier which uniquely identifies the device or is associated with the device in a unique manner (e.g., MAC address, 'Bob's phone', etc.).

When a user of a device opts to transmit the device identifier of his or her device or acquiesces to transmission of the device identifier, the communication component 210 may receive the device identifier from the device. A device may transmit a corresponding device identifier to the system 200 and the device identifier associated with the device may be received as a response to the device identifier request.

Once a connection is established between a device and a system, such as the system 200 of FIG. 2, the communication component 210 may transfer data between the device and the system 200 of the vehicle based on or utilizing the established connection. As use of the device or mobile device may utilize the connection to control one or more aspects or one or more components of the vehicle. To this end, the communication component 210 may receive a request to control one or more components of the vehicle, such as from an application installed or running on the device. The communication component 210 may interface with a device (e.g., a networking component of a device), transmit, or receive data between the system 200 and the device. Further, the communication component 210 may employ short range communications, near field communications, Wi-Fi, wireless, telematics, communications, telecommunications, or other technologies, etc.

The interface component 220 of the system 200 may render notifications, video, audio, alerts, menus, setup, or other information to a driver or other occupant of a vehicle. For example, the interface component may notify an occupant or driver of a vehicle of a connection request made from or initiated by a device, such as a smart phone. Additionally, the interface component 220 may present an occupant of a vehicle with a corresponding device identifier of the device. In other words, the interface component 220 may prompt an occupant (e.g., the driver) of a vehicle to accept or deny a connection request from a device by prompting the driver using cues associated with the device identifier of the device. Based on a response of the occupant or driver, a connection may be formed or established between the device and the vehicle or system of the vehicle. Explained another way, the interface component 220 may prompt an occupant of the vehicle to acquiesce to one or more connections between the vehicle and one or more devices to enable one or more of the devices to access, manipulate, or control one or more aspects of the vehicle (e.g., one or more components of the vehicle).

The interface component 220 may render prompts in a visual manner, as audio, or via other feedback (e.g., tactile feedback, vibrations, email, text notifications, etc.) for an occupant of a vehicle or driver of a vehicle. The interface component 220 may render a connection request for an occupant of a vehicle based on a device identifier of a device. For example, the interface component may alert a driver that a device wishes to connect having a device identifier associated with a nickname, such as "Bob's Phone". The alert may include audio, such as a beep, or be presented on a display interface, such as the interface 220 of FIG. 1, for example. A driver or occupant may be provided with an interface 220 which includes a heads-up-display (HUD) enabling a driver to "accept" or "deny" connection requests or incoming connection requests using buttons on the steering wheel, buttons on a console of the vehicle, hardware buttons, software buttons (e.g., on-screen or on-display soft buttons), etc.

Further, the media component 260 may render connection requests, corresponding device identifiers, or device nicknames for a driver or occupant in a manner which mitigates an amount of hassle or driver interaction than a typical pairing procedure. For example, the system 200 of FIG. 2 does not utilize a PIN during the connection setup or connection request process. Accordingly, a driver or other occupant of the vehicle is not required to manually enter a PIN to pair or connect a device with the vehicle or system 200 of a vehicle. As mentioned, a device may act as an initiator of a connection while a vehicle acts as a target. In this way, a number of initiators and a number of targets is reduced. Conversely, during other types of pairing (e.g., pairing or connecting utilizing a PIN), the vehicle may act as an initiator searching for an unknown number of targets (e.g., devices). In a scenario where a device is acting as an initiator for a connection and there are multiple (e.g. two or more vehicles or systems), an occupant or driver of respective vehicles may act as a gatekeeper for authentication or establishing a connection, thus ensuring connection security. Additionally, a user of a mobile device acting as an initiator may be prompted with an alert to select which vehicle or system to which he or she wishes to send a connection request.

Other aspects of the interface component 220 enable an occupant, such as a driver of a vehicle, to provide, create, establish, authenticate, control, or manage a connection with a device without requiring navigation or setup, such as manual navigation through a connection menu. In other words, a device may be authenticated by presenting a driver or other occupant of a vehicle with an interface which allows the driver to select "yes" or "no", "approve" or "deny", "enable" or "disable", or the like to control or manage formation or establishing one or more connections. A driver or occupant may respond to a connection request rendered by the interface component 220 in a variety of ways. For example, the driver may point, click, touch, actuate, or speak a response to facilitate formation or denial of a connection between a device and a system 200 or vehicle. In this way, the interface component may receive a response to the connection request from an occupant or driver of the vehicle.

In one or more embodiments, the media component 260 may include a text-to-speech (TTS) component or TTS functionality which allows a driver or occupant to speak his or her selection, rather than utilizing a button to make a selection, for example. Because connections may established based on a response of an occupant (e.g., to a prompt provided by the interface component 220), a response based authentication scheme is provided where a driver or occupant may control pairing or the connection process, rather than utilizing a PIN, for example.

Additionally, the interface component 220 may prompt an occupant of a vehicle for additional or supplemental information. For example, the supplemental information may be related to one or more aspects of a connection, such as an authentication preference (e.g., as a prompt, such as "save user" or "one-time guest") corresponding with a device. An authentication preference associated with a device may be indicative of a temporal aspect of a connection or how long a connection between a device and a system 200 should last. The interface component 220 may allow an occupant or driver to select among different authentication preferences, such as one time authentication (e.g., a single connection session), permanent authentication (e.g., storing the device identifier on the storage component 280 such that the same device may reconnected on an ongoing basis without need for a connection request or occupant approval for subsequent connections), timer based authentication (e.g., determining a predetermined length of a connection), etc.

Regardless, when an occupant of a vehicle provides a response (e.g., user input) to a connection request, the interface component 220 may receive the response to the connection request and provide confirmation accordingly. Further, the interface component 220 may identify, provide, or render a list of connected devices, pending connection requests, saved devices, etc. In this way, the interface component 220 may notify an occupant or driver of a status of one or more connections or previous connections.

One benefit provide by the interface or rendering associated with the interface component 220 is that the interface enables a driver to maintain, control, or manage one or more connections between a vehicle, vehicle computer, or systems of a vehicle and one or more devices (e.g., within range of the vehicle). In this way, the interface component 220 enables an occupant, such as the driver, to act as a gatekeeper for authentication or pairing of a device and the system 200. In other words, an approval based authentication scheme for pairing devices and/or systems is provided such that an occupant may utilize an interface to approve or deny connections between respective devices (e.g., associated with occupants of the vehicle) and systems of a vehicle or the vehicle.

The authentication component 230 may be utilized to authenticate a connection request and establish, control, or manage a connection between a corresponding device and a vehicle or system of the vehicle based on a response to a connection request (e.g., from a driver of the vehicle or based on driver approval, etc.). For example, the authentication component 230 may establish or create a connection when driver approval is received from the driver of the vehicle. Stated another way, the authentication component 230 may authenticate a connection between a device and a vehicle based on a connection request and an approval or corresponding response from an occupant of the vehicle.

Explained yet another way, the authentication component 230 may authenticate one or more devices (or connections associated therewith) utilizing an authentication scheme based on driver approval or occupant approval (e.g., associated with an identity of a user, occupant, driver, etc.) to accept, establish, create, authenticate, etc. or otherwise acquiesce to one or more connections between one or more devices and the system 200. When a driver or other occupant accepts a connection request, a connection may be established between the device associated with the device identifier and the vehicle or a system of the vehicle. The connection may be made over a network, a wireless network, hotspot, utilizing Bluetooth® technology, etc.

An authentication scheme based on occupant approval may be considered less intrusive to a driver or require less engagement from a driver or operator of a vehicle that other authentication schemes associated with PIN entry or menu navigation. For example, in other authentication schemes where a device is a target, a PIN may be useful because multiple targets (e.g., devices) may exist in range of the initiator (e.g., vehicle). In these scenarios, a PIN may help identify or distinguish one target device from another. According to one or more embodiments, because there is generally merely a single target, (e.g., one vehicle or one target vehicle) that a device is attempting to connect with, no PIN is required. When multiple targets (e.g., vehicles or target vehicles) are present (e.g., multiple targets available), occupants of respective vehicles may act as gatekeepers to control connections between an initiator device and a target, vehicle, or target vehicle. Additionally, the device or an interface on the device may prompt a user as to which vehicle to send a connection request to when multiple vehicles are present. For example, when multiple vehicles are present or together, the device may initiate a connection based on signal strength associated with one or more of the vehicles. In one or more scenarios, the device may initiate a connection to the vehicle associated with a stronger or greater signal strength.

The authentication component 230 may pass a device identifier of a device (e.g., received by a communication component) to a storage component 280 when an occupant indicates that he or she desires for a connection to be formed between a corresponding device and a system 200 or a vehicle. In one or more embodiments, the storage component may store a device identifier of a device based on an authentication preference, which may be selected by an occupant of a vehicle. Examples of authentication preferences include permanent authentication (e.g., "save user"), temporary authentication (e.g., "one-time use"), timed authentication (e.g., connection for a pre-determined period of time), etc. In this way, pairing may be facilitated without the use of a shared secret key or the like.

The security component 240 may enable transmission of data between a device and the system 200 to be secure. For example, the security component 240 may encrypt data which is transferred over a connection between a device and the system 200, thereby making data transmitted across the connection unreadable for everyone except the rightful receivers (e.g., the system 200 of the vehicle or the device). The security component 240 may utilize an encryption algorithm to send encrypted data or receive encrypted data. The encryption algorithm may be utilized to encrypt or decrypt the data between an encrypted format and a decrypted format. In other words, transfer of data between a device and the system 200 may be based on one or more encryption algorithms.

In one or more embodiments, the security component 240 may verify or continually verify a connection between a device and a system 200. For example, the security component 240 may determine whether or not a device belongs as part of a connection or as part of a pair of trusted devices by checking to see if a device utilizes the correct standards, protocols, application programming interfaces (APIs) formatting, etc. to communicate with the system 200. This may be achieved utilizing a challenge-response scheme. If the security component determines that the device is not communicating in accordance with the correct protocols or procedures, the security component 240 may disable a connection between the system 200 and the device, ban the device, ban the device identifier, blacklist the corresponding device, blacklist the corresponding device identifier, notify a user, driver, occupant of a vehicle, etc.

As mentioned, the storage component 280 may be utilized to store data or metadata associated with devices, such as a device identifier, corresponding authentication preferences, etc.

A controller area network 250 connects one or more components of a vehicle, such as the media component 260, the HVAC component 270, etc. The media component 260 may provide a driver (or an individual or user connected via a device) to operate infotainment, a rear entertainment system (RES), the radio, or other systems on a vehicle. Additionally, the media component 260 may have navigation functionality. In one or more embodiments, the media component may have text-to-speech functionality as well. The HVAC component 270 may allow a driver (or an individual connected via a device) to manage a fan speed, temperature, air conditioning, heating, cooling, etc. or other aspects of an HVAC unit of a vehicle.

Figure 3:
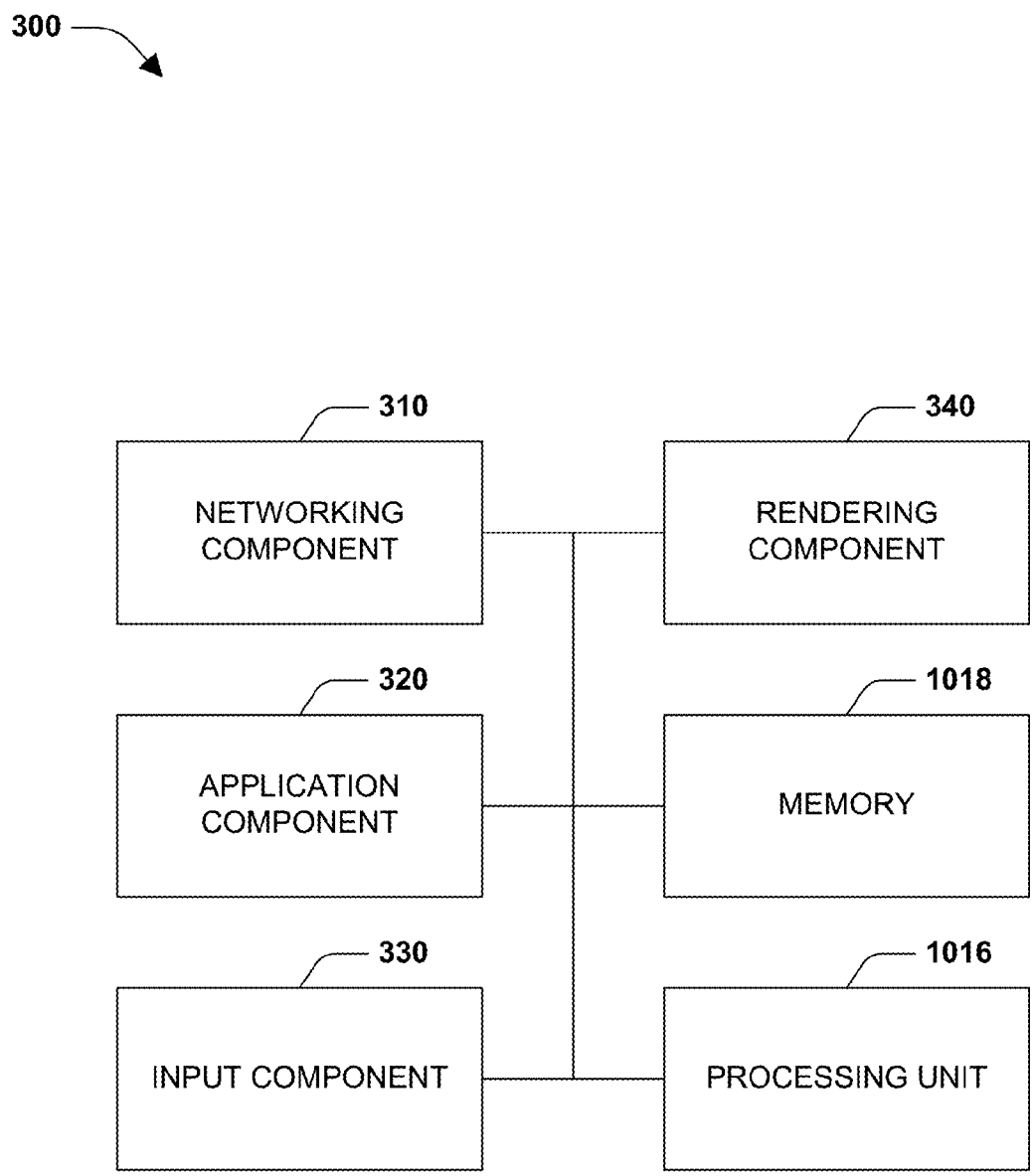
FIG. 3 is an illustration of an example component diagram of a system for connection authentication, according to one or more embodiments.

FIG. 3 is an illustration of an example component diagram of a system 300 for connection authentication, according to one or more embodiments. The system 300 may include a networking component 310, an application component 320, an input component 330, a rendering component 340, a memory 1018, and a processing unit 1016.

The networking component 310 may perform an inquiry to find one or more devices, one or more systems, or one or more vehicles to which to connect. In other words, the networking component 310 may perform an inquiry for one or more target devices, systems, or vehicles which the device may be connected to, as desired by a user of a device. The networking component 310 may interface with a communication component (e.g., 210 of FIG. 2) of a vehicle. For example, a connection may be established between the networking component and one or more target systems.

An application component 320 may enable an occupant of a vehicle (e.g., who is also a user of a device), such as a passenger to utilize or run an application on his or her device to initiate a request for a connection (e.g., connection request) with a vehicle or system of a vehicle, thereby making the device an initiator of a connection and the vehicle as target or a beacon.

In one or more embodiments, an application may be a software module executed on a device or a device. The software module or application may be iPhone™ based or Android™ based. The application may be stored on a device or device and may be part of embedded software of the device or integrated into an operating system of the device. In other embodiments, the application can be downloaded via a wired or wireless system, (e.g., using Apple's iTunes™, Google Play Store, etc.). For ease of discussion, the disclosure will be described based on a software module being an application stored on a memory of the device and executed by a processing unit of the device. As used herein, the software module will be referred to as an application or an 'app'.

The application component 320 may execute an application or a module on the device to initiate pairing or connection of the device with a vehicle or a system of a vehicle. In other words, the application enables a device to act as an initiator for a connection, rather than having a vehicle act as the initiator. To this end, the vehicle or a system of a vehicle would be a target or a beacon which the device is seeking. The application may be web-based, browser-based, interface-based, installed from an app store, etc.

The application component 320 may execute an application which enable or turns on a communication channel or communication technology associated with the device. For example, the application may enable Bluetooth® when Bluetooth® is found to be disabled. Additionally, the application may determine whether or not the device has discovery mode enabled. Discovery mode is a mode which enables the device to pair or connect with another device, system, or vehicle. If the application determines that the device has discovery mode disabled, the application may enable or turn on discovery mode to facilitate connection authentication. In one or more embodiments, the application may provide a list of one or more devices, systems, vehicles, etc. found by the networking component 310 to which the device may be connected (e.g., potential connections).

The application executed by the application component may generate a connection request for a device acting as an initiator for a connection with one or more target systems. For example, one or more of the target systems may be a vehicle. The networking component 310 may transmit the connection request to a vehicle or a system of the vehicle to initiate pairing or a connection between the device and the vehicle (e.g., in response to a corresponding user input at the application level, such as selecting a send connection request button). In one or more embodiments, the connection request may not include a device identifier of the device without user permission or consent. In other embodiments, the connection request may automatically transmit the device identifier of the device (e.g., based on a setting or user preference).

The networking component 310 may interface with the communication component 210 of a vehicle (e.g. of FIG. 2), and may receive a request for a device identifier (e.g., device identifier request) from a vehicle or system. For example, the networking component 310 may receive a device identifier request in response to a connection request. Further, the application may respond to the device identifier request by having the networking component 310 transmit the device identifier of the device. In one or more embodiments, the networking component 310 may transmit the device identifier to a communication component of a vehicle in response to the device identifier request.

In one or more embodiments, the application may prompt a user of a device to provide consent prior to having the networking component 310 transmit the device identifier of the device to an external source, such as the communication component of a vehicle or system. The rendering component 340 may render a notification for a user of a device when a device identifier request is received by the networking component 310. In this way, the system 300 may provide the user with an option to accept or deny the device identifier request and transmit the device identifier to an external source or not transmit the device identifier, thereby cancelling the connection request previously initiated by the networking component 310.

The application may enable a user of a device (e.g. system 300) to control one or more aspects of a vehicle or one or more components of a vehicle, such as a media component, HVAC component, etc., when a connection between the device and the vehicle or system exists (and the device is in range of the vehicle or connection). In one or more embodiments, driver approval of one or more actions may be implemented such that the driver or occupant of the vehicle remains as a gatekeeper for actions proposed by a user or passenger utilizing a device within the vehicle. For example, the driver may be notified when a passenger or user attempts to modify or change the temperature of the vehicle using the HVAC component.

The application may automatically reconnect a device with a vehicle when the device is in range of the vehicle, when the device is turned on, the application is launched, a button is pressed on the device or the vehicle, the vehicle ignition is switched on, based on a location of the vehicle (e.g., where the location of the vehicle may be determined by a navigation system, a global positioning system (GPS), etc.), opening or closing a door to the vehicle, pulling a door handle, in response to a voice command, engaging the vehicle in another way, etc.

The input component 330 and the rendering component 340 may be integrated as a single component, such as a touch screen, for example. The input component 330 may further include a microphone to capture audio, an image capture device, etc. The rendering component 340 may render the application on a display of the device along with one or more features associated with an application, such as a menu, setup, an accept or deny a request prompt, etc.

Figure 4:
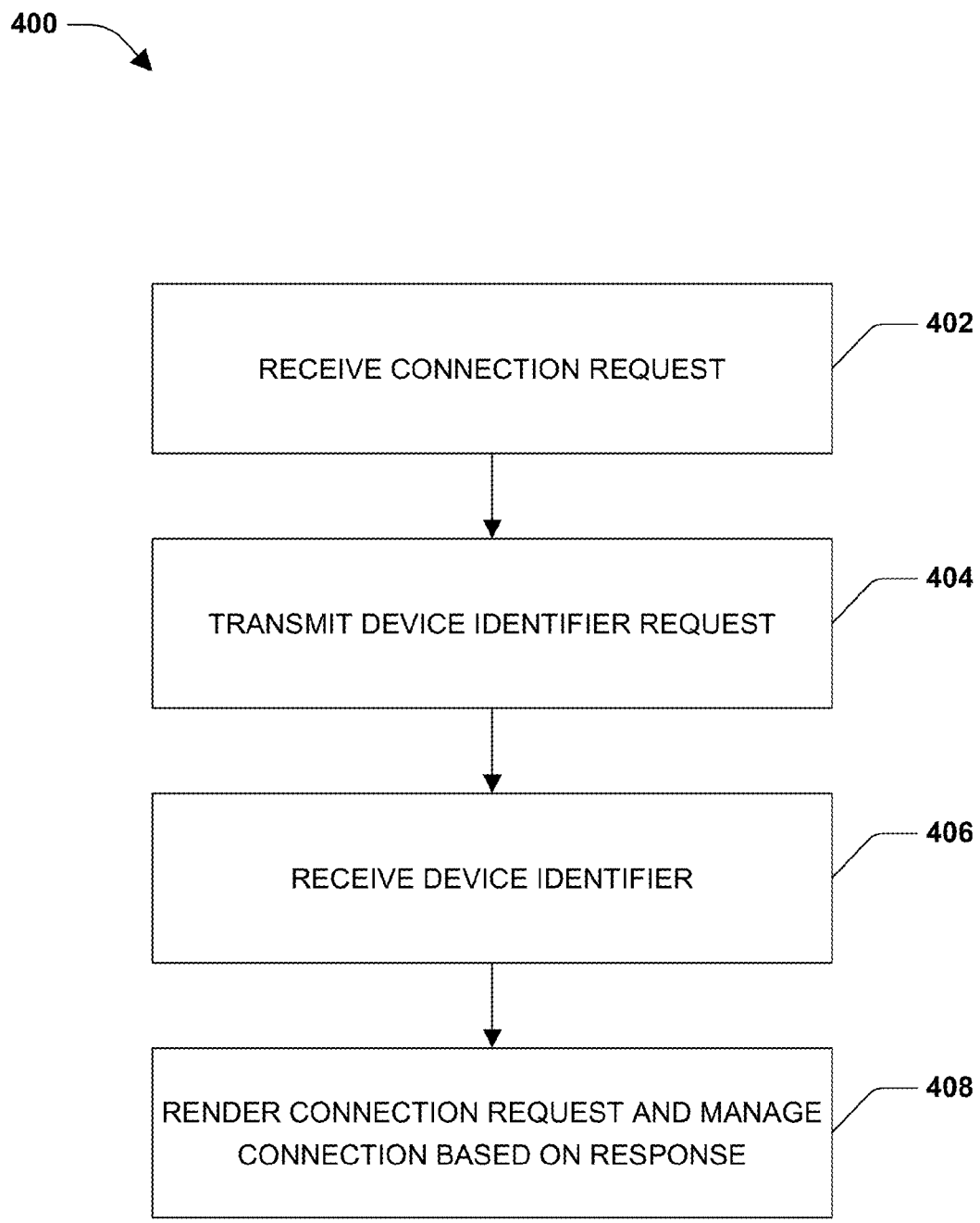
FIG. 4 is an illustration of an example flow diagram of a method for connection authentication, according to one or more embodiments.

FIG. 4 is an illustration of an example flow diagram of a method 400 for connection authentication, according to one or more embodiments. At 402, a connection request may be received from a device running an application or a software module. At 404, a device identifier request may be transmitted (e.g., to the device). At 406, a device identifier associated with the device may be received in response to the device identifier request. At 408, a connection request may be rendered and presented to an occupant of a vehicle, such as a driver of a vehicle. Additionally, a connection may be created, managed, established, etc. based on the response of the driver of the vehicle. In other words, the driver has the final say on whether or not a connection between the vehicle and a device is approved, denied, etc.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 5:
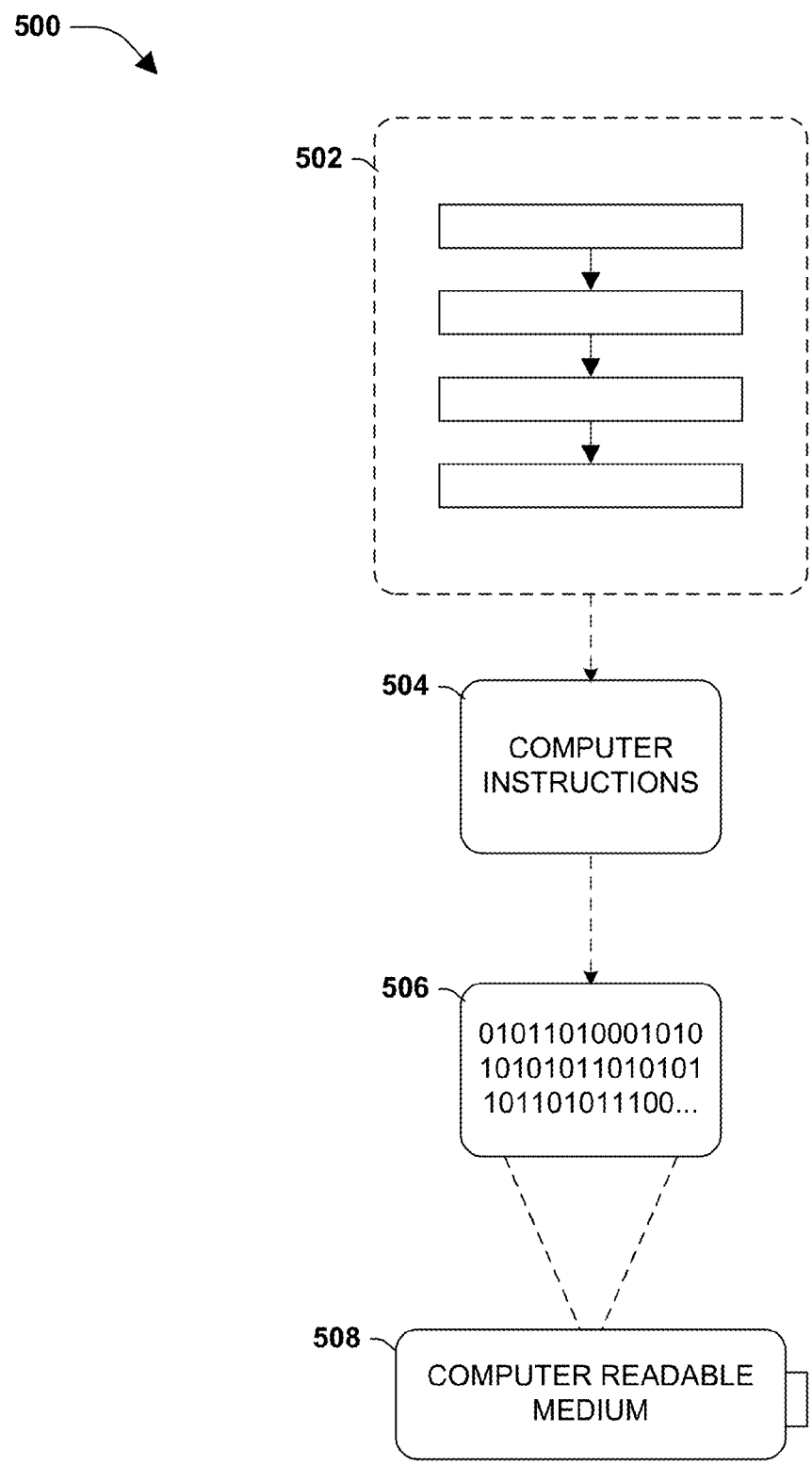
FIG. 5 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as the method 400 of FIG. 4. In another embodiment, the processor-executable instructions 504 may be configured to implement a system, such as the system 200 of FIG. 2 or the system 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications with one or more other devices.

According to one or more aspects, a method for connection authentication is provided, including receiving a connection request from a device acting as an initiator for a connection, transmitting a device identifier request in response to the connection request, receiving a device identifier associated with the device in response to the device identifier request, and rendering the connection request for an occupant of a vehicle based on the device identifier of the device, wherein the vehicle acts as a target for the device initiating the connection.

The method may include receiving a response to the connection request from the occupant of the vehicle, establishing the connection between the device and the vehicle based on the response to the connection request, transferring data between the device and the vehicle based on the established connection, receiving a request to control one or more components of the vehicle, or transferring the data based on one or more encryption algorithms.

In one or more embodiments, the occupant of the vehicle is a driver of the vehicle. The connection may be a wireless connection, a Bluetooth® connection, or based on short range communications. The device identifier may include a media access control (MAC) address of the device. Rendering the connection request may include rendering audio, video, or other feedback.

According to one or more aspects, a system for connection authentication is provided, including a communication component, an interface component, and an authentication component. The communication component may receive a connection request from a device acting as an initiator for a connection, transmit a device identifier request in response to the connection request, or receive a device identifier associated with the device in response to the device identifier request. The interface component may render the connection request for an occupant of a vehicle based on the device identifier of the device, wherein the vehicle acts as a target for the device initiating the connection. The authentication component may manage the connection between the device and the vehicle based on a response to the connection request.

The interface component may receive a response to the connection request from the occupant of the vehicle. The communication component may transfer data between the device and the vehicle based on an established connection. The communication component may receive a request to control one or more components of the vehicle. The connection may be a wireless connection, a Bluetooth® connection, or based on short range communications. The device identifier may include a media access control (MAC) address of the device.

According to one or more aspects, a system for connection authentication is provided, including a networking component and an application component. The networking component may perform an inquiry for one or more target systems. One or more of the target systems may include a vehicle. A connection may be established between the networking component and one or more of the target systems.

The application component may generate a connection request for a device acting as an initiator for a connection with one or more of the target systems, receive a device identifier request in response to the connection request, or transmit a device identifier associated with the device in response to the device identifier request.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for connection authentication, comprising:
   receiving a connection request from a passenger's mobile device acting as an initiator for a connection;
   transmitting a device identifier request including a request for a media access control address (MAC) to the passenger's mobile device in response to the connection request;
   receiving a confirmation request at the passenger's mobile device requesting permission to transmit the device identifier including the MAC in response to receiving the device identifier request;
   receiving the device identifier including a media access control address (MAC) associated with the passenger's mobile device and a supplemental information related to an aspect of the connection including at least one of one-time authentication, permanent authentication, or timer based authentication, in response to the device identifier request and in response to the confirmation request;
   rendering by a vehicle the connection request for a passenger of the vehicle based on the device identifier of the passenger's mobile device;
   accepting by the driver of the vehicle the connection request; and
   receiving a request to control one or more components of the vehicle from the passenger's mobile device, wherein the vehicle acts as a target for the device initiating the connection.

2. The method of claim 1, comprising receiving a response to the connection request from the passenger of the vehicle.

3. The method of claim 2, comprising establishing the connection between the passenger's mobile device and the vehicle based on the response to the connection request.

4. The method of claim 3, comprising transferring data between the passenger's mobile device and the vehicle based on the established connection.

5. The method of claim 4, comprising transferring the data based on one or more encryption algorithms.

6. The method of claim 1, wherein the connection is a wireless connection, a Bluetooth® connection, or based on short range communications.

7. The method of claim 1, wherein rendering the connection request comprises rendering audio, video, or other feedback.

8. A system for connection authentication, comprising:
   a communication component configured to receive a connection request from a passenger's mobile device acting as an initiator for a connection, transmit a device identifier request including a request for a media access control address (MAC) and a request for supplemental information related to an aspect of the connection including at least one of one-time authentication, permanent authentication, or timer based authentication, to the passenger's mobile device in response to the connection request, and receive a device identifier including the MAC associated with the mobile device and the supplemental information related to the aspect of the connection in response to the device identifier request;
   an interface component configured to render the connection request for a passenger of a vehicle based on the device identifier of the passenger's mobile device and the supplemental information, wherein the vehicle acts as a target for the passenger's mobile device initiating the connection;
   an application component configured to accept by a driver of the vehicle the connection request; and
   an authentication component configured to manage the connection between the passenger's mobile device and the vehicle based on a response to the connection request, wherein the communication component further receives a request from the passenger's mobile device to control one or more components of the vehicle, and wherein the communication component, the interface component, application component, or the authentication component is implemented via a processing unit.

9. The system of claim 8, wherein the interface component receives a response to the connection request from the passenger of the vehicle.

10. The system of claim 8, wherein the communication component transfers data between the passenger's mobile device and the vehicle based on an established connection.

11. The system of claim 8, wherein the connection is a wireless connection, a Bluetooth® connection, or based on short range communications.

12. A system for connection authentication, comprising:
a networking component configured to perform an inquiry for one or more target systems comprised of a vehicle; and
an application component configured to:
  generate a connection request for a passenger's mobile device acting as an initiator for a connection with one or more of the target systems;
  receive a device identifier including a request for a media access control address (MAC) and a request for supplemental information related to an aspect of the connection including at least one of one-time authentication, permanent authentication, or timer based authentication request, in response to the connection request;
  render a confirmation request to the passenger's mobile device thereby prompting for confirmation to transmit a device identifier including the MAC and the supplemental information in response to receiving the device identifier request and the supplemental information request;
  transmit the device identifier including the MAC and the supplemental information associated with the passenger's mobile device in response to the device identifier request, and the supplemental information request;
  accepts by a driver of the vehicle the connection request; and
  controls one or more components of the vehicle with the passenger's mobile device, wherein the networking component or the application component is implemented via a processing unit.

13. The system of claim 12, wherein a connection is established between the networking component and one or more of the target systems.

* * * * *